United States Patent [19]

Nilakantan et al.

[11] Patent Number: 5,526,489
[45] Date of Patent: Jun. 11, 1996

[54] SYSTEM FOR REVERSE ADDRESS RESOLUTION FOR REMOTE NETWORK DEVICE INDEPENDENT OF ITS PHYSICAL ADDRESS

[75] Inventors: Chandrasekharan Nilakantan, San Jose; Ly Loi, Fremont; Nagaraj Arunkumar; Michael J. Seaman, both of San Jose, all of Calif.

[73] Assignee: 3Com Corporation, Santa Clara, Calif.

[21] Appl. No.: 33,914

[22] Filed: Mar. 19, 1993

[51] Int. Cl.$^6$ .......................... G06F 13/00; G06F 15/16; G06F 15/163; G06F 15/177
[52] U.S. Cl. ........................ 395/200.02; 364/DIG. 1; 364/241.9; 364/242.94; 364/242.95; 364/242.96; 364/DIG. 2; 364/940.61; 364/940.62; 340/825.52
[58] Field of Search .................................. 395/200, 425, 395/325, 275; 340/825.52

[56] References Cited

U.S. PATENT DOCUMENTS

| | | | |
|---|---|---|---|
| 4,815,034 | 3/1989 | Mackey | 364/900 |
| 5,113,495 | 5/1992 | Uehara | 395/200 |
| 5,251,300 | 10/1993 | Halliwell et al. | 395/200 |
| 5,287,103 | 2/1994 | Kasprzyk et al. | 340/825.52 |
| 5,289,579 | 2/1994 | Punj | 395/200 |

OTHER PUBLICATIONS

Plummer, "An Ethernet Address Resolution Protocol —or— Converting Network Protocol Addresses to 48.bit Ethernet Address for Transmission on Ethernet Hardware", Nov. 1982 Symbolics, Inc.
Finalyson et al., "A Reverse Address Resolution Protocol", Jun. 1984 Stanford Univ.
Tannenbaum, *Computer Networks*, 2nd Ed., 1988 Prentice Hall, pp. 1–49 (Introduction).
Loi, "RARP Design Specification"—Draft, Aug. 1992 3Com Corp-Network Systems Div., pp. 1–11.
Arunkumar, "Boundary Routing Design Specification"–Draft, Sep. 1992 3Com Corp-Network Systems Div., pp. 1–13.

*Primary Examiner*—Thomas C. Lee
*Assistant Examiner*—D. Dinh
*Attorney, Agent, or Firm*—Haynes & Davis

[57] ABSTRACT

A reverse address resolution protocol for use in a communication network which allows resolution logic to provide a higher level protocol information (such as an IP address) to a source of a request for such information, independent of the physical network address of such source. The protocol is used in a processor having a plurality of ports, at least one of such ports connected by a point-to-point channel to a remote network device. Reverse address resolution protocol is responsive to a resolution request from the remote network device across the point-to-point channel to supply the higher level protocol information based upon the port through which the resolution request is received, rather than the physical network address of the requesting device. Thus, a remote device may be coupled to a network, and connected to a central management site across a point-to-point communication link, in a "plug and play" mode. The person connecting the device to the remote network does not need to determine the physical network address of the device or configure the device with a higher level address protocol.

26 Claims, 8 Drawing Sheets

PACKET EXCHANGE OVER WAN MEDIA

SYSTEM FOR REVERSE ADDRESS RESOLUTION FOR REMOTE NETWORK DEVICE INDEPENDENT OF ITS PHYSICAL ADDRESS

CROSS REFERENCE TO RELATED APPLICATION

The present application is related to U.S. patent application Ser. No. 07/871,113; filed Apr. 20, 1992; entitled SYSTEM FOR EXTENDING NETWORK RESOURCES TO REMOTE NETWORKS; invented by John H. Hart now abandoned. This related application was owned at the time of invention and is currently owned by the same Assignee as the present application.

FIELD OF THE INVENTION

The present invention relates to start up protocols for devices in communication networks; and more particularly to systems which allow a machine without a configured higher level protocol address to obtain such address without a unique machine identifier.

DESCRIPTION OF RELATED ART

A widely accepted series of international standards describing network architectures is known as the OSI reference model. See, generally, Tannenbaum, *Computer Networks,* 2nd Ed., 1988, Prentice-Hall. According to this model, network communications are divided into a plurality of protocols within layers of the model. Local Area Networks (LANs) operate using medium access protocols within the lower layers, layers 1 and 2, of the OSI model, such as the carrier sense multiple access with collision detection CSMA/CD, IEEE Standard 802.3, also known as ETHERNET, and the token ring access ring method of IEEE Standard 802.5. These two lower layers are typically broken down into the physical layer and the data link layer, with the data link layer being further broken down into a media access control (MAC) layer, and a logical link layer.

Systems, such as personal computers, workstations, and mainframe computers, attached to the LANs each have a distinct lower level protocol identifier known as the physical network address or MAC address. LAN frames forwarded to a destination system on the network under these lower level protocols contain the destination system MAC address, or other physical network address, as a destination. LAN frames forwarded from a source system on the network contain the source system MAC address, or other physical network address, as a source address. Systems communicate by encapsulating additional protocols (OSI layers 3–7) within the lower layer LAN frames. These higher level protocols are grouped into suites such as the TCP/IP protocol suite and the XNS protocol suite. Many LANs contain groups of end systems that use different higher level protocol suites. These higher level protocol suites also assign unique higher level protocol identifiers to systems which transmit or receive frames in the network.

For instance, an internet protocol IP address is assigned to each system operating within an internet protocol network. The internet protocol address includes a network address portion and a host address portion. The network address portion identifies a network within which the system resides, and the host address portion uniquely identifies the system in that network. Processors routing packets in an internet protocol network rely on the network address portion of the IP address in a frame to find the local area network of the destination machine. Once the local area network of the destination is located, the frame is forwarded to that network where the host address portion is relied upon to assign a MAC address for the destination machine to the packet. Thus, higher level protocol address places the device in a particular network or subnetwork, so that the higher level protocol can effectively manage the routing of packets among the networks, without maintaining a table of the unique physical access layer identifiers for all of the terminals in the network.

In order to communicate in such a network, the machine must first obtain its higher level protocol address. This address is typically assigned by a central authority, such as the Internet Activities Board, or by a network manager. Normally, a particular machine learns its IP address by a configure operation, in which a technician uses a local terminal to configure the machine. In a centrally managed network, this could be a cumbersome task, involving travel of skilled personnel away from the central management location. However, a reverse address resolution protocol RARP has been developed for networks such as TCP/IP or SNMP protocols. The RARP allows a machine without a configured IP address to obtain an IP address from a remote server. The machine broadcasts a request and waits until an RARP server responds. In the request, the requesting machine must provide its physical network address (MAC address) to uniquely identify itself, allowing the server to map it into an IP address.

This RARP protocol works fine, so long as the central management site is aware of the physical network address of the devices being added to the network. In order to find out the physical network address, all of the system being added to the network must be passed through the central management site so that the address can be read from these machines, or a local technician must read the physical network address from the machine and telephone the central site. This process makes connecting a new device to a network difficult. Further, this process of physically reading the physical network address from the box is prone to human errors. Such addresses are typically very long (MAC addresses are 48 bits long), and can be misread or typed in erroneously.

It is desirable to have so-called "plug and play" network devices. Such devices can be plugged in and turned on by unskilled personnel. However, the need to find out the physical network address of the box detracts from this ability.

Accordingly, it is desirable to provide a technique for resolving higher level protocol addresses, without reliance on the lower level protocol addresses.

SUMMARY OF THE INVENTION

The present invention provides a reverse address resolution protocol for use in a communication network which allows resolution logic to provide a higher level protocol address, or other information, to a source of a request for such address, independent of the physical network address of such source. The protocol according to the present invention is used in a processor having a plurality of ports, at least one of such ports connected by a point-to-point channel to a remote network device. The reverse address resolution protocol is responsive to a resolution request from the remote network device across the point-to-point channel to supply the higher level protocol address based upon the port through which the resolution request is received, rather than the physical network address of the requesting device. Thus, a remote device may be coupled to a network, and connected to a central management site across a point-to-point communication link in a "plug and play" mode. The person connecting the device to the remote network does not need to determine the physical network address of the device or configure the device with a higher level address protocol. All this can be handled automatically.

Thus, the present invention can be characterized as an apparatus for resolving higher level protocol addresses in response to resolution requests from a source of resolution requests in a communication network. The apparatus comprises a central processor having a plurality of ports for connection to the communication network, and resolution logic which is coupled to the communication network and in communication with the central processor. The resolution logic provides a higher level protocol identifier in response to a particular port in the plurality of ports through which the resolution request is received by the central processor, independent of the lower level protocol identifier of the source of the resolution request. The resolution logic may be a routine executed by the central processor, or a routine executed by a network management processor coupled to the communication network, and in communication with the central processor.

The resolution logic, according to one aspect, includes a resolution table that is configurable independent of the lower level protocol identifiers, which assigns higher level protocol identifiers to particular ports of the central processor through which the resolution requests may be received.

The higher level protocol identifier may comprise an internet protocol IP address, which includes a network address for the source of the resolution request, and a host address for the source of the resolution request. Further, the higher level protocol may be utilized by a network management system, which communicates network-wide, while the lower level protocol comprises a medium access protocol.

The resolution logic, according to the present invention, relies on the source of the resolution request being coupled across a point-to-point communication channel to the particular port of the processor receiving the request. In this way, the port serves as a virtual identifier for the source of the request.

Thus, the present invention can also be characterized as an apparatus for connecting a first network and a second network. This apparatus includes a communication link, a first processor, and a second processor. The first processor has a first interface coupled to the first network and a second interface coupled to the communication link. The second processor has a lower level protocol identifier and is coupled to the second network and to the communication link. Resolution logic is coupled to the first network to provide a higher level protocol identifier to the second processor in response to a resolution request through the second interface of the first processor, independent of the lower level protocol identifier of the second processor. In this manner, the first processor can configure the higher level protocol addresses for devices in the system, independent of the lower level protocol addresses.

According to another aspect of the invention, the first processor includes resources to provide network services to frames of data in the first and second networks through the first and second interfaces, and the second processor includes resources to extend the second interface of the first processor transparently to the second network.

The resolution logic may comprise a routine executed by the first processor, or a routine executed by a network management processor located in the first network.

Accordingly, a technique which greatly improves the "plug and play" capability of a network device has been provided. Remote networks may be set up using this system, without requiring error prone and cumbersome techniques to acquire the physical network address of each device being added to the network.

Other aspects and advantages of the present invention can be seen upon review of the figures, the detailed description, and the claims which follow.

DETAILED DESCRIPTION OF THE PREFERRED EMBODIMENTS

Figure 1:
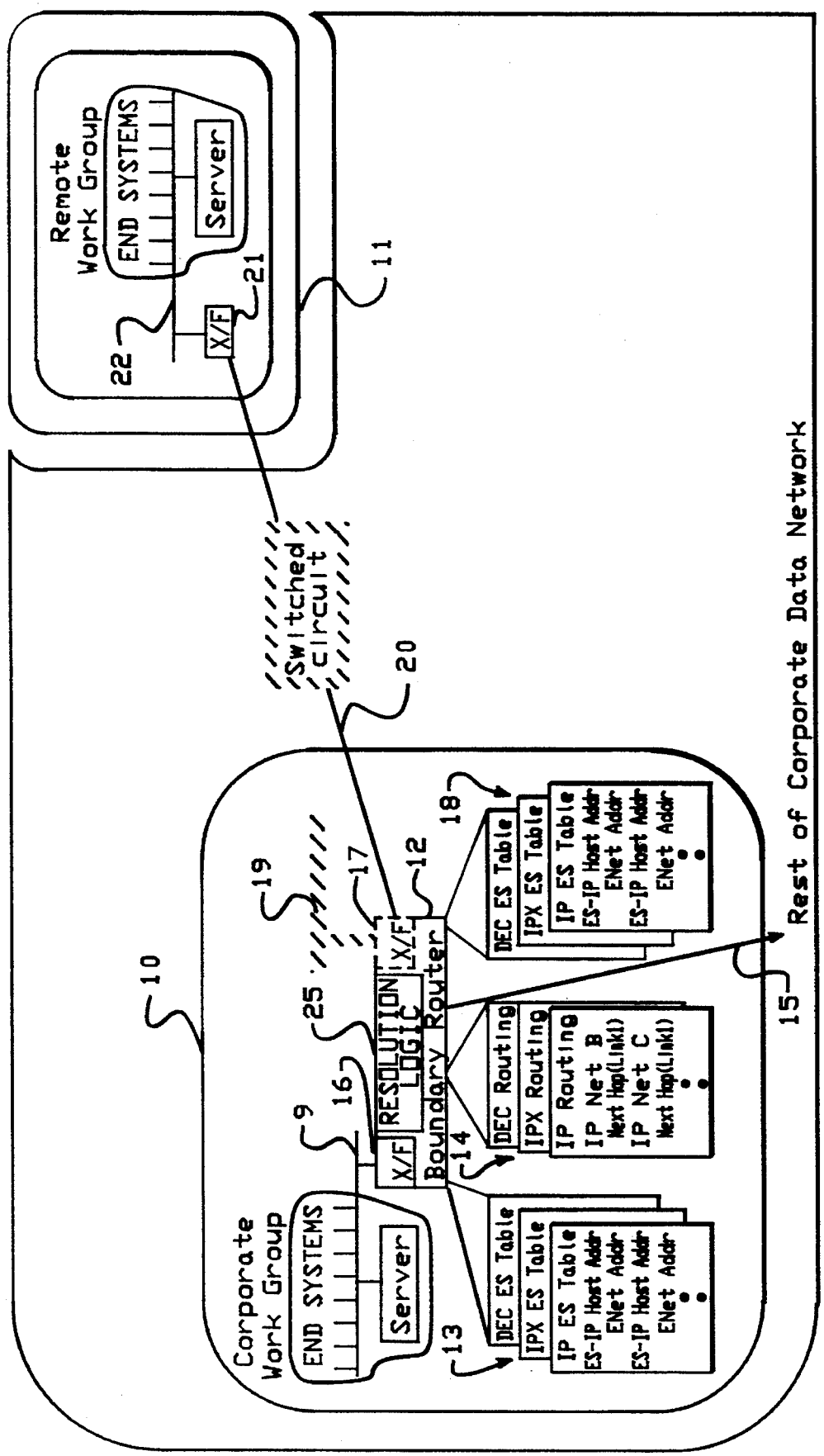
FIG. 1 is a schematic diagram of a system including the reverse address resolution logic according to the present invention.
Figure 7:
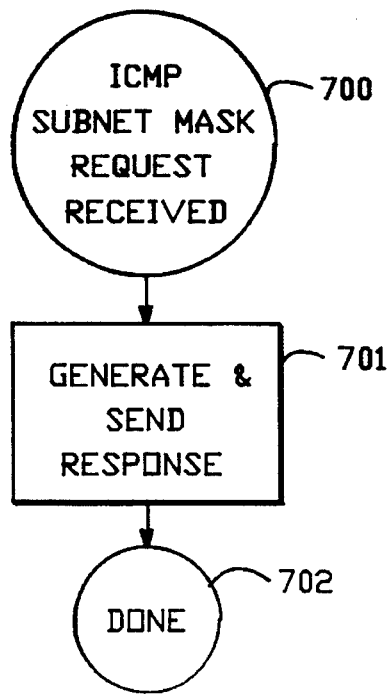
FIG. 7 is a diagram of the subnet mask response generation process used in the sequence of FIG. 3.
Figure 8:
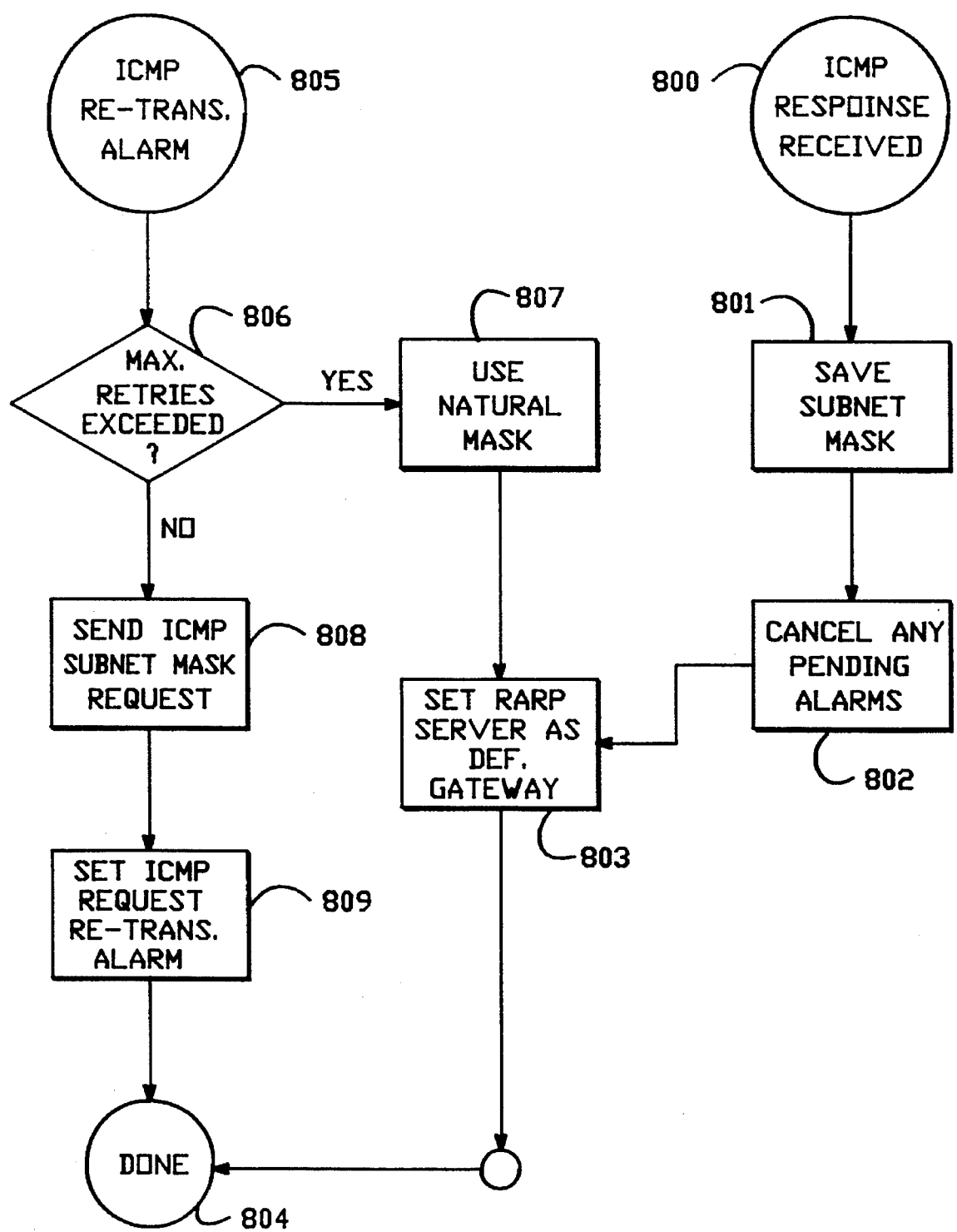
FIG. 8 is a diagram of the subnet mask response acceptance process used in the sequence of FIG. 3.
Figure 9:
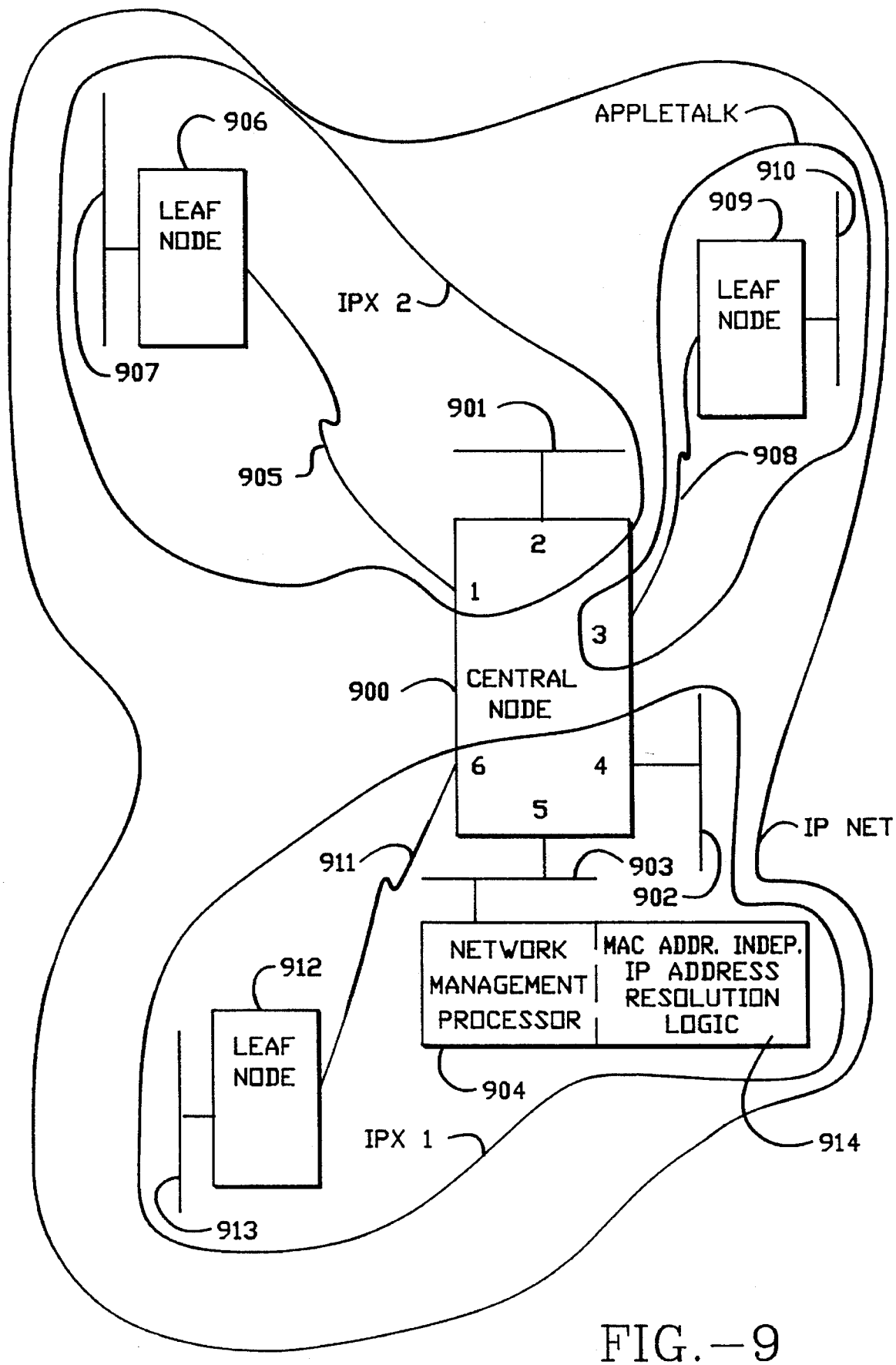
FIG. 9 is a schematic diagram illustrating one network environment in which the present invention may be used.

A detailed description of preferred embodiments of the present invention is provided with respect to FIGS. 1–9. FIG. 1 illustrates application of the present invention in a preferred embodiment. FIGS. 2–8 illustrate the extended protocol for reverse address resolution used in a preferred embodiment of the present invention. FIG. 9 provides an overview of a network in which the present invention may be applied.

FIG. 1 provides a schematic diagram of an apparatus for connecting a first network 10 to a second network 11 using address resolution logic 25 according to the present invention. The first network 10 includes a first LAN 9 which includes a plurality of end systems and a server, and may be interconnected to other LANs using intermediate systems (not shown) known in the art. Coupled to the LAN 9 is a boundary router 12. The boundary router 12 is an intermediate system in the network which provides network resources serving higher level protocol suites which, in one unique embodiment, constitute routing resources. As such, the boundary router 12 maintains end system directories 13 for the local LAN 9 and global routing information 14 to serve the routing functions according to the higher level protocol suites. Thus, the end system directories 13 will include DEC end system tables, IPX end system tables, IP end system tables, and others to serve other protocol suites that are operating in the network 10. The boundary router 12 may also be coupled to other portions of the corporate data network as schematically illustrated at arrow 15.

The boundary router 12 includes a local interface 16 which serves the local LAN 9 providing access to the network resources within the boundary router to end systems on LAN 9. The boundary router 12 could also have interfaces to other local LANs as well. In addition, the boundary router 12 includes a remote routing interface 17, which provides an interface to the network resources for end systems in the remote network 11. In support of the remote interface 17, the boundary router maintains end system directories 18 serving the higher level protocol suites in the remote network 11.

As illustrated schematically by the hatched symbol 19, the remote network 11 appears to the end systems in the local LAN 9 as if it were a LAN connected locally to the boundary router 12. This appearance is maintained across a communication link 20, which may use telephone or other dial up lines, leased lines, satellites, wireless systems, or other communication media configured as a point-to-point channel, to a routing adapter 21, which is coupled to the remote network 11. The remote network 11 includes a remote LAN 22 to which a plurality of end systems and servers may be connected as known in the art. In addition, the LAN 22 may be coupled to other LANs in the remote network 11 through intermediate systems (not shown) as known in the art. The routing adapter 21 provides resources for extending the remote routing interface 17 transparently to the remote network 11 across the communication link 20. From the perspective of the remote network 11, the routing adapter 21 provides the same functionality as a router, while the routing adapter itself operates independent of the higher level protocol suites.

The system thus provides efficient communication between remote networks, and a corporate network, through a boundary router (e.g., net 11, routing adaptor 21, link 20, boundary router 12, net 9).

The routing adapter 21 includes hardware performing physical network access protocols for connection to the network 22. Also, such hardware is assigned a physical network address, or MAC address, to uniquely identify the system for the lower level protocol suites. However, in order to participate in the higher level protocol suites managed by the boundary router 12 or elsewhere in the central network 10, an identifier which serves such higher level protocols is needed for the routing adapter 21. Thus, the boundary router 12 includes resolution logic 25 to provide such identifier in response to the interface 17 across which a request for such identifier is received.

FIGS. 2–8 illustrate the reverse address resolution protocol executed by the resolution logic 25 in the boundary router of FIG. 1 according to a preferred embodiment, in which the higher level protocol address comprises an internet protocol IP address, such as used by SNMP (Simple Network Management Protocol) standard network management servers.

Figure 2:
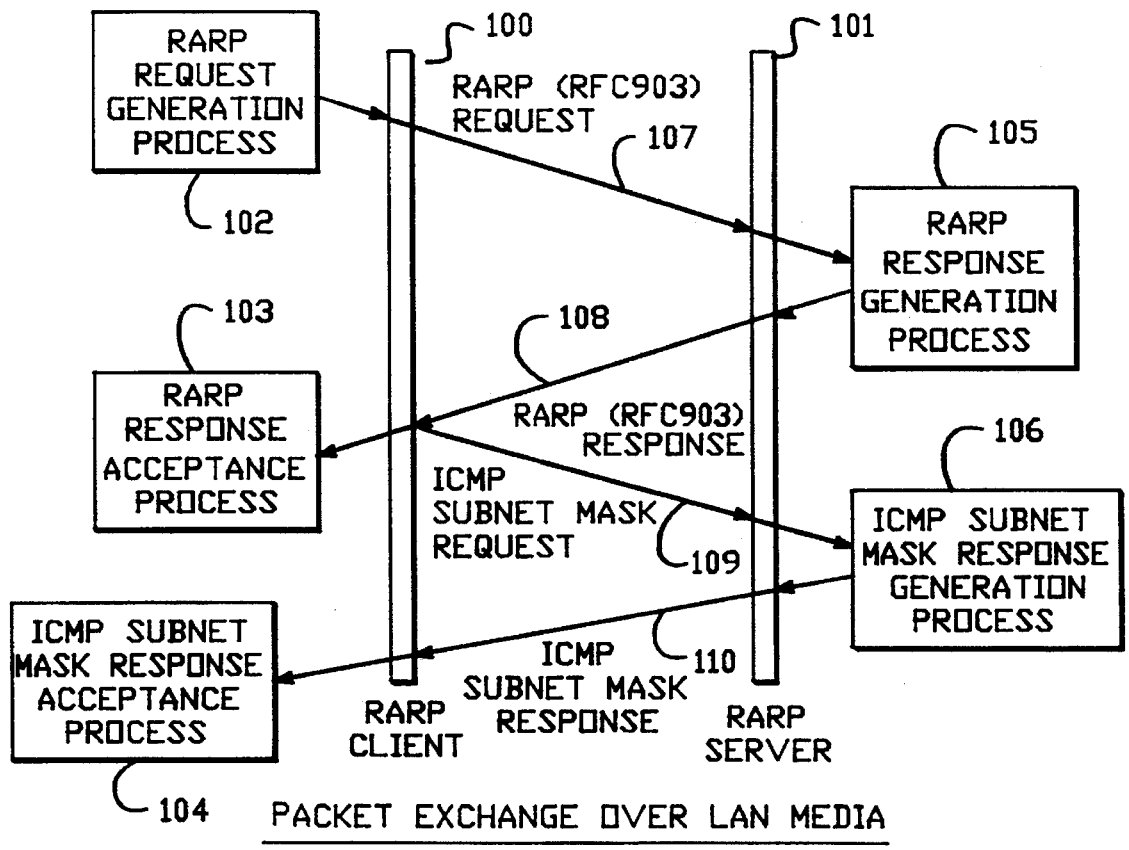
FIG. 2 illustrates a prior art packet exchange sequence for reverse address resolution over LAN media.

FIG. 2 illustrates the prior art mechanism which is utilized in the preferred system on ports of the routing adaptor coupled to LAN media. The structure of FIG. 2 includes a first interface 100 corresponding to the RARP client port of the routing adapter 21, and a second interface 101 corresponding to an RARP server in the central network 10. The routing adapter 21 includes RARP request generation process 102, an RARP response acceptance process 103, and an ICMP subnet mask response acceptance process 104. The resolution logic 25 in the RARP server includes an RARP response generation process 105, and an ICMP subnet mask response generation process 106.

Using the industry standard RARP request generation process, as specified in RFC 903 dated June, 1984, the RARP request generation process 102 in the client generates an RARP RFC 903 request 107, which includes the client's MAC address. This request 107 is received at the server interface 101 and the RARP response generation process 105 generates a response 108 by accessing a database or other logic which assigns an IP address based upon the MAC address in the request 107. The RARP response acceptance process 103 in the client receives the IP address from the response 108, stores it as appropriate in the client, and generates an ICMP subnet mask request 109. The server 101 receives the request 109 and the ICMP subnet mask response generation process 106 supplies a subnet mask response 110 to the client 100. The ICMP subnet mask response acceptance process 104 then configures the client with the IP address and the subnet mask, and assigns the address of the server 101 as the default gateway address.

Figure 3:
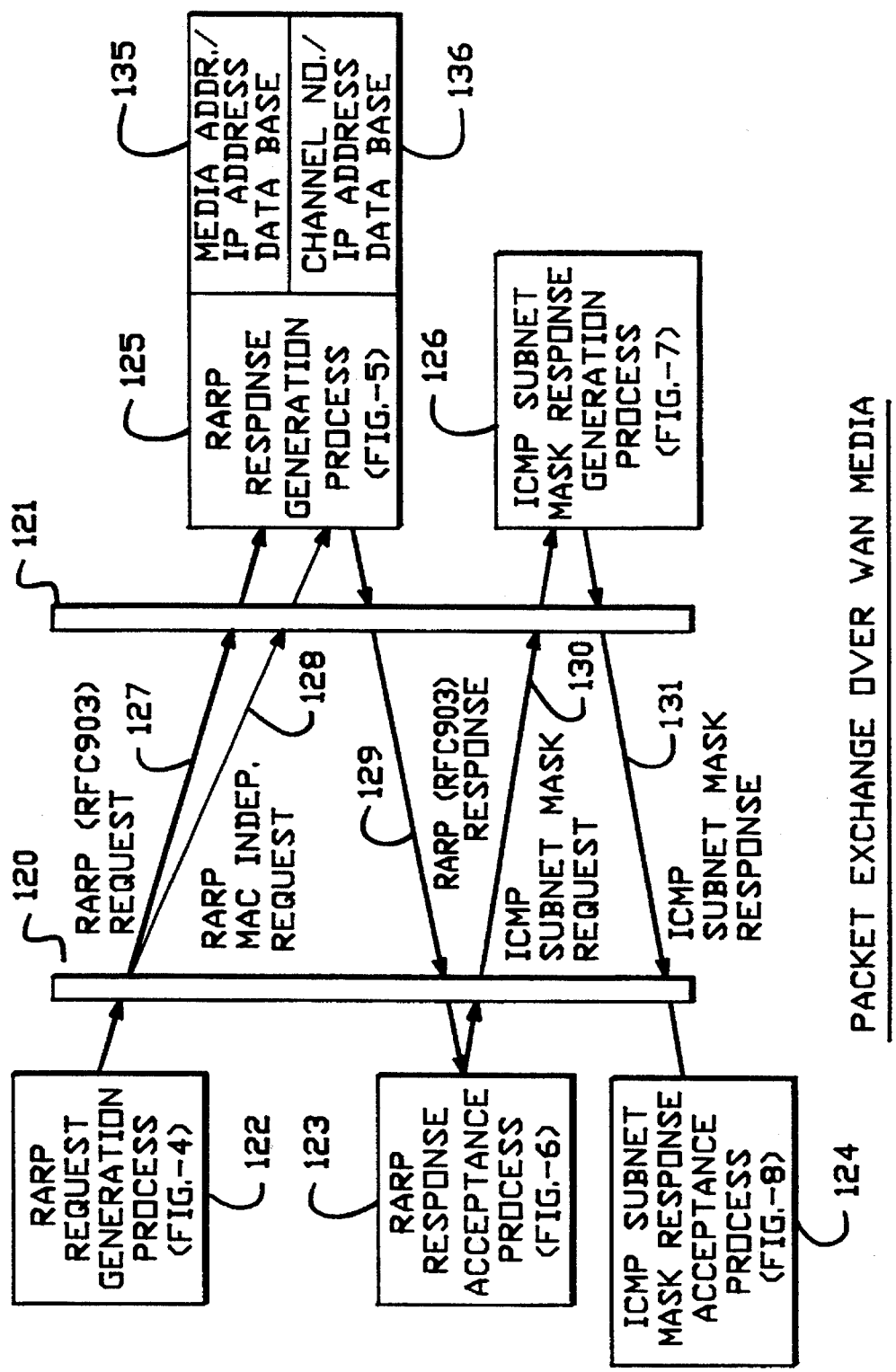
FIG. 3 illustrates a packet exchange sequence over a WAN medium as extended according to the present invention.

FIG. 3 illustrates this process as extended according to the present invention for reverse address resolution independent of the physical network address of the client. In this aspect, the interface 120 corresponds to the routing adapter 21 operating as an RARP client. The interface 121 corresponds to the interface 17 of the boundary router 12 operating as an RARP server. The RARP server 121 need not be located in the boundary router 12. Rather, it can be located in any system or intermediate system coupled to the networks served by the boundary router 12.

In the extended sequence, as illustrated in FIG. 3, the routing adapter also includes an RARP request generation process 122 (FIG. 4), an RARP response acceptance process 123 (FIG. 6), and an ICMP subnet mask response acceptance process 124 (FIG. 8). The RARP server in the boundary router includes an RARP response generation process 125 (FIG. 5) and an ICMP subnet mask response generation process 126 (FIG. 7).

As in the prior art system, the RARP request generation process 122 in the client 120 generates an RARP RFC 903 request 127. Also, the process 122 generates an extended request 128, which indicates to the receiver that the address resolution must be conducted independent of the MAC address.

The RARP response generation process 125 receives both the RFC 903 request 127 and the MAC independent request 128. If the response can be served with the RFC 903 request, then the response generation process 125 proceeds that way. However, if the MAC address of the client 120 has not been previously communicated to the response generation process 125, then the MAC independent request 128 must be utilized.

The RARP response generation process 125 is coupled to a media address/IP address database 135 and to a channel number/IP address database 136. These databases are configured by the network manager to assign IP addresses throughout the network. The channel number/IP address database is relied upon when the media address (MAC address) of the client 120 is not available at the time the IP address is configured.

In either event, the RARP response generation process 125 generates an RARP RFC 903 response 129 which includes an IP address. The RARP response acceptance process 123 in the client 120 accepts the IP address and generates an ICMP subnet mask request 130. In the server 121, the ICMP subnet mask response generation process 126 supplies an ICMP subnet mask response 131. The client 120 receives that response and executes the ICMP subnet mask acceptance process 124.

Figure 4:
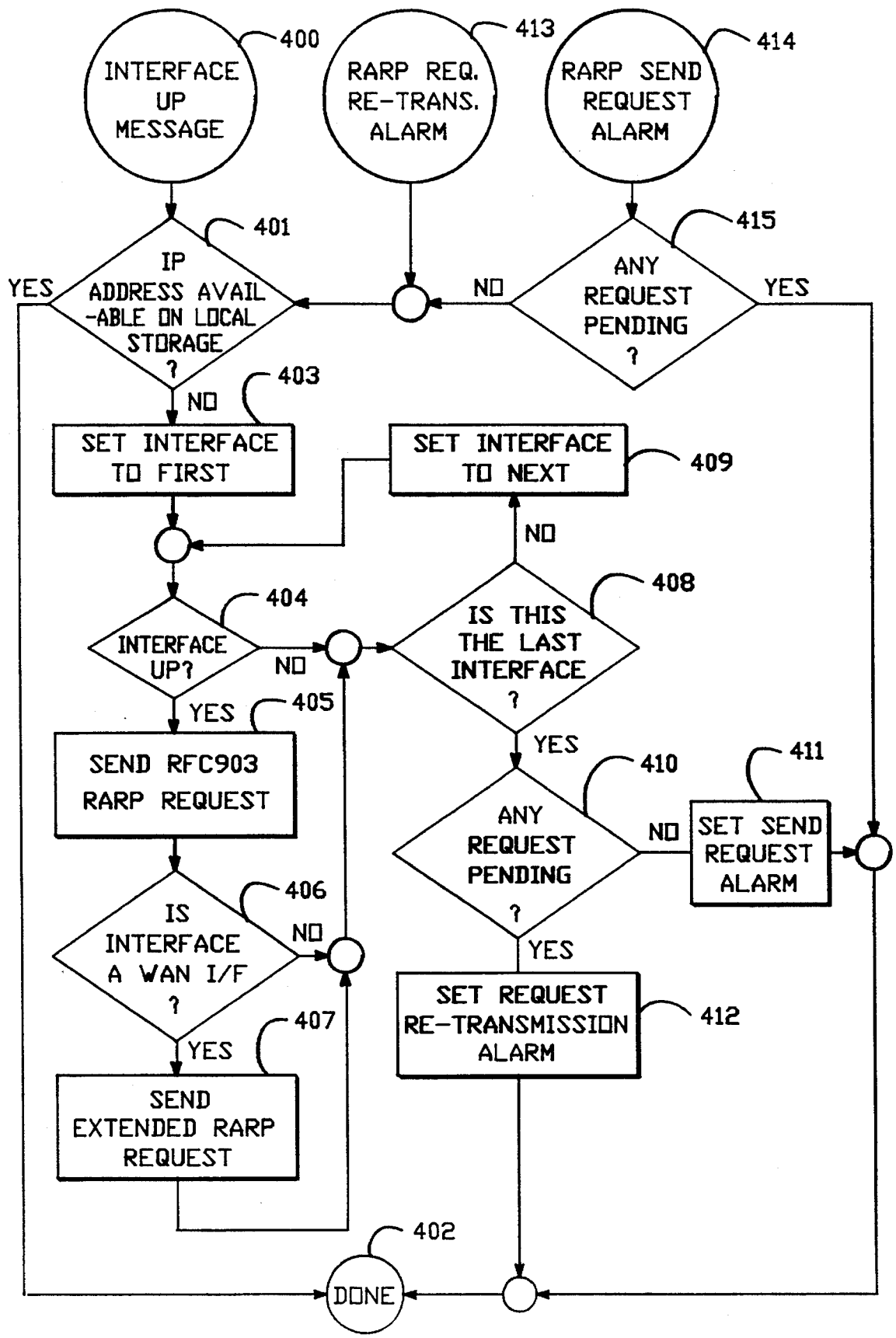
FIG. 4 illustrates the resolution request generation process used in the sequence of FIG. 3.

FIG. 4 shows the RARP request generation process corresponding to block 122 of FIG. 3. This routine loops through all of the interfaces or ports on the remote node, also called a leaf node, to determine its IP address. The algorithm starts with an interface up message 400. After an interface up message, the algorithm tests whether the IP address is available in local storage (step 401). If the address is available in local storage, then the routine is done, as indicated at step 402. If the IP address is not available, then an index for the interfaces is set to the first interface (step 403). Next, the algorithm tests whether the interface is up (step 404). If the interface is up, then the RFC 903 RARP request is sent through the interface (step 405). Next, the algorithm tests whether the interface is wide area network WAN interface (step 406). If it is a WAN interface, then the extended RARP request is sent which requires response independent of the MAC address (step 407).

If at step 404, the interface is not up, or if at step 406, the interface is not a WAN interface, or after the extended RARP request is sent in step 407, the algorithm loops to step 408. In step 408, the algorithm tests whether the index indicates that the last interface has been tested. If not, the index is incremented in step 409 and the algorithm returns to step 404. If the last interface has been served, then the algorithm tests whether any requests have been successfully sent out and are still pending (step 410). If there are no requests pending because no request was successfully sent, then a send request alarm is set (step 411) and the algorithm is done. If there are requests pending in step 410 because one or more requests were successfully sent, then a request retransmission alarm is set in step 412, and the algorithm is done.

The request retransmission alarm results in re-execution of the loop beginning at step 413 which proceeds directly to step 401. The send request alarm set by step 411 results in re-execution of the loop beginning with step 414. After step 414, the algorithm tests whether any requests are still pending in step 415. If there are pending requests, the algorithm is done, if there are no pending requests, then the loop is entered by proceeding to step 401.

Thus, the RARP request generation process 122, as shown in FIG. 4, sends both the standard RFC 903 RARP request, which requires response based on the MAC address, and an extended RARP request, which requires response independent of the MAC address, across WAN interfaces. The WAN interface in the preferred system is the point-to-point communication channel 120 between the boundary router and the routing adapter of FIG. 1.

Thus, the extended RARP interface composes a message using the standard message format according to RFC 903. The message is sent in the data portion of an ethernet frame. An Ethernet frame carrying an RARP request has the usual preamble, ethernet source and destination addresses, and packet type fields in front of the frame. The frame type contains the value 0×8035 to identify the contents as an RARP message. The data portion of the frame contains the 28-octet RARP message.

The RARP client obtains the physical network address of the interface on which the RARP request will be sent out according to the standard techniques known in the art. The RARP request contains the RARP client's physical network address (MAC address) as the source hardware address field, and 0×FFFFFFFFFFFF as the destination hardware address. Both the source and destination higher level protocol addresses are undefined, thus, 0. The RARP request opcode is 3 for the standard RARP RFC 903. The protocol according to the present invention uses opcode 16 for the extended request requiring MAC address independent resolution. Of course, any other available opcode could be used.

When the RARP client sends out its first broadcast request for address resolution, it also sets a retransmission timer at 5 seconds according to one embodiment (step 412). This large delay ensures that the server has ample time to satisfy the request and return an answer. When the timer expires, if the client already has an IP address, it cancels the timer and the RARP client goes idle. Otherwise, for each interface which is up, it broadcasts another request and sets the timer again. It will retransmit indefinitely until it receives a response. At each retransmission, the timer will double until it reaches a maximum value 15 minutes. From then on, it will continue using this value.

The RARP client accepts only one response and discards any duplicate responses. Thus, before accepting any response, the client first ensures that no IP address has already been assigned to it.

Figure 5:
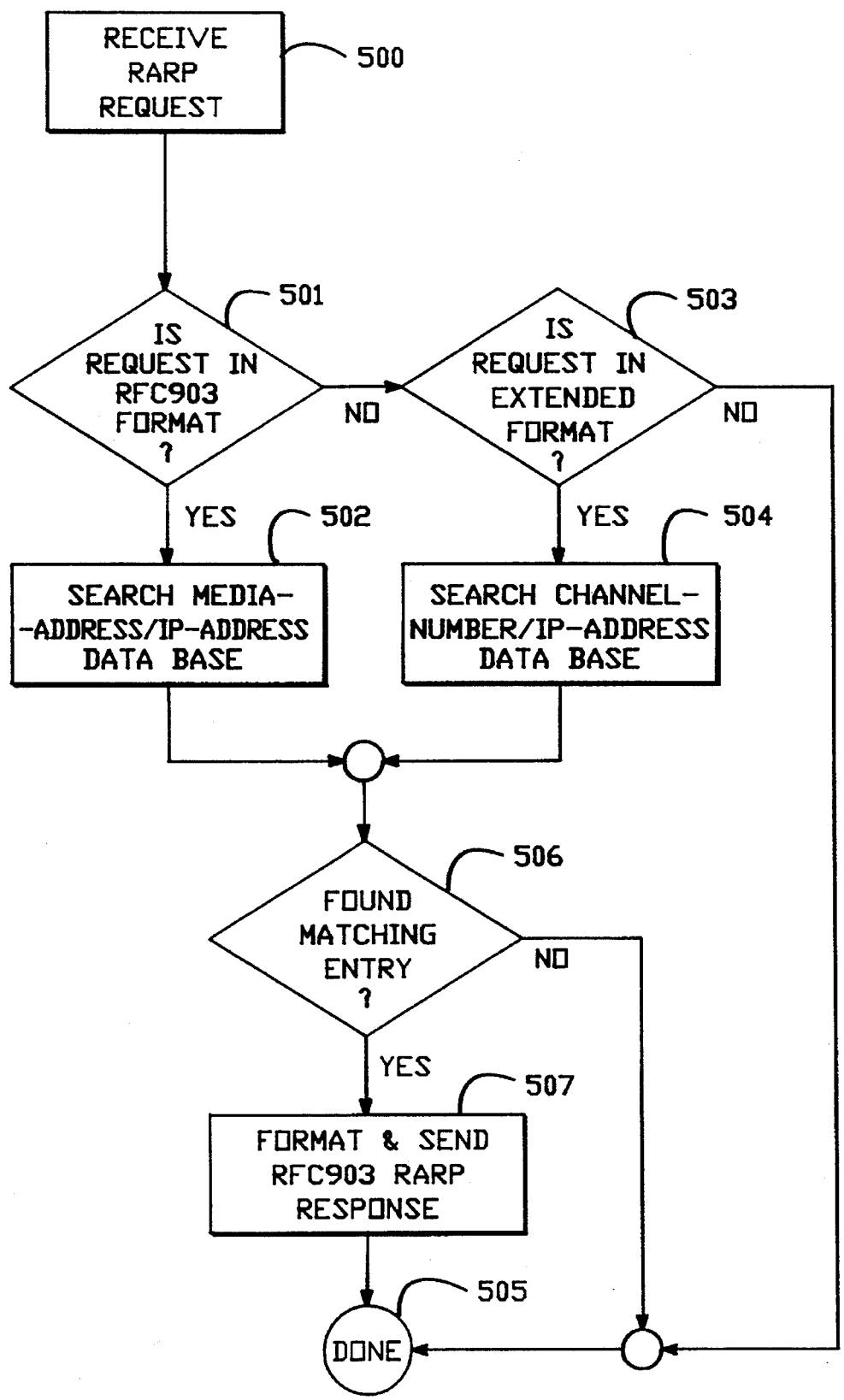
FIG. 5 illustrates the resolution request response generation process used in the sequence of FIG. 3.

FIG. 5 illustrates the RARP response generation process corresponding to block 125 of FIG. 3. This algorithm begins with receiving the RARP request 127 or 128 in step 500. After step 500, the algorithm tests whether it is a standard RFC 903 request (step 501).

If the request is the standard RFC 903 format request at step 501, then the algorithm searches the media address/IP address database 135 in step 502.

If the request was not in the standard RFC 903 format, then the algorithm tests whether it is in the extended format (e.g. opcode 16) in step 503. If it is in the extended format, then the channel number/IP address database is searched in step 504. If the request is not in either format, then the algorithm is done as indicated at step 505.

After searching the database in step 502 or in step 505, the algorithm tests whether a matching entry was found in step 506. If no matching entry was found, then the algorithm is done in block 505. If a matching entry was found, then the algorithm formats and sends an RFC 903 RARP response packet which provides an IP address to the client (step 507).

Figure 6:
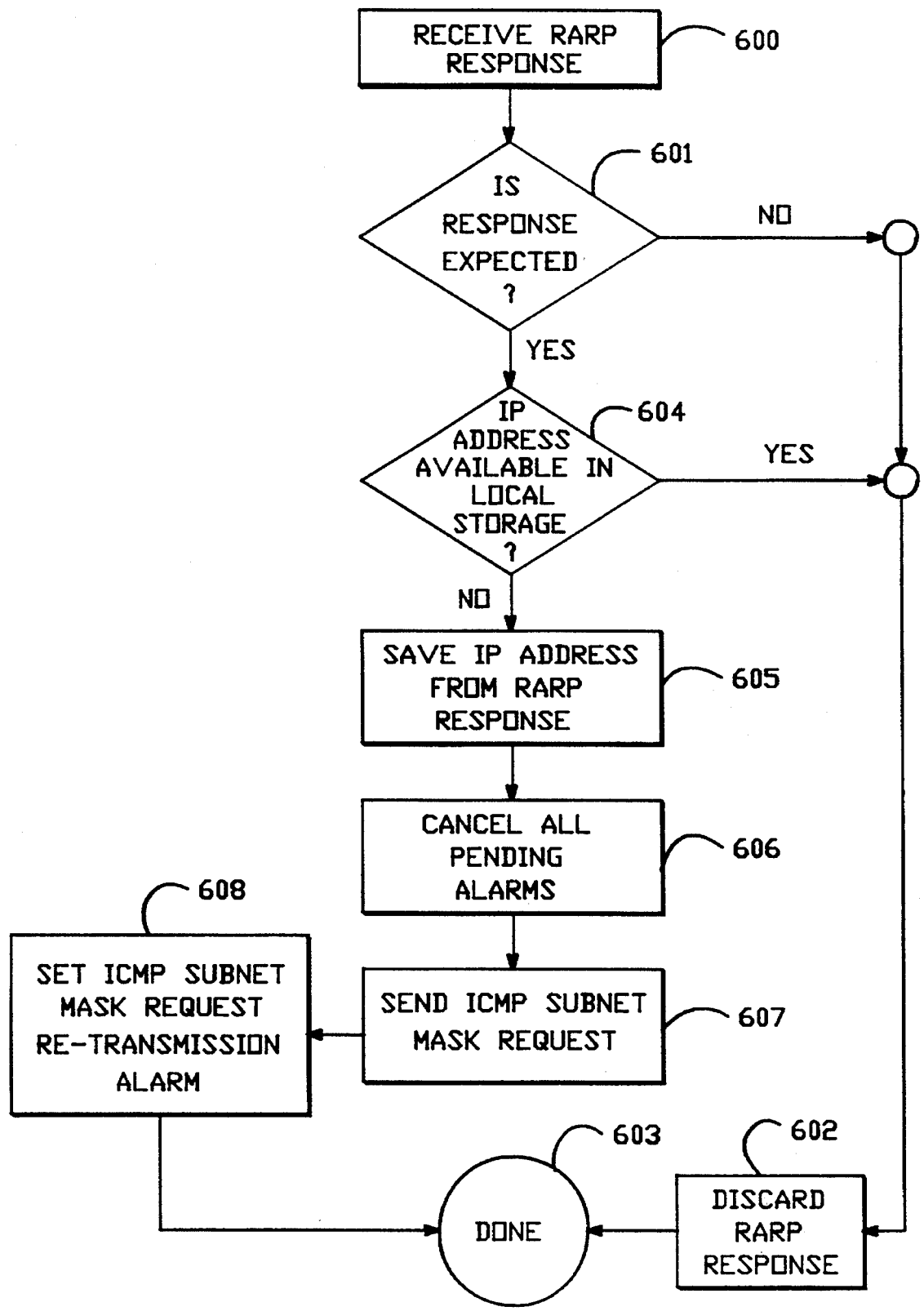
FIG. 6 illustrates the resolution request response acceptance process used in the sequence of FIG. 3, which results in a request for a subnet mask in IP networks.

FIG. 6 illustrates the RARP response acceptance process 123 of FIG. 3. This algorithm begins with receiving the RARP response in step 600 which was generated in step 507 of FIG. 5. First, the algorithm determines whether the response is expected in step 601. If it is not expected, then the RARP response is discarded in step 602, and the algorithm is done in step 603. If the response is expected, then the algorithm tests whether an IP address is already available in local storage (step 604). If the address is already available, then the process loops to step 602. If the IP address is not available in step 604, then the IP address from the RARP response is saved in local storage (step 605). After step 605, all pending alarms in the client are cancelled (step 606), and an ICMP subnet mask request is sent across the interface (block 607). After sending the subnet mask request in step 607, an ICMP subnet mask request retransmission alarm is set in step 608, and the algorithm is done.

Thus, once the client or leaf node has obtained the IP address, it initiates an ICMP address mask request to the responder, and sets a retransmission timer of 5 seconds (step 608). The request specifies the RARP server which provided the IP address as the destination. If the leaf node does not obtain a successful response, and its retransmission timer expires, it will broadcast another ICMP subnet mask request on all available interfaces and reset the timer to 5 seconds. The maximum number of retransmissions is 10 in one embodiment. If the tenth retransmission fails, it assigns the natural subnet mask to the IP address class. This ensures that the software does not flood the network indefinitely with unnecessary traffic.

FIG. 7 illustrates the ICMP subnet mask response generation process corresponding to block 126 of FIG. 3. This process begins with receiving the ICMP subnet mask request in step 700. After receipt of the request, a response is generated and sent to the client in step 701. After sending the response, which includes a subnet mask for the previously sent IP address, the algorithm is done (step 702).

FIG. 8 illustrates the ICMP subnet mask response acceptance process corresponding to block 124 of FIG. 3. This algorithm is initiated upon receipt of the ICMP response in step 800. When the response is received, the subnet mask is saved in step 801. Next, any pending alarms are cancelled in step 802. After cancelling the alarms in step 802, the RARP server which supplied the responses to the earlier request is defined as the default gateway in step 803. After defining the default gateway, the algorithm is done as indicated at step 804.

If an ICMP retransmission alarm is asserted, this routine receives an indication in step 805. First, the algorithm determines in response to this alarm whether a maximum number of retries has been exceeded in step 806. If it has been exceeded, then the natural mask is utilized for the IP address as indicated at step 807, and the RARP server is set as the default gateway in step 803. If the maximum number of retries has not been exceeded, then an ICMP subnet mask request is generated in step 808, and the ICMP request retransmission alarm is reset in step 809. Finally, the algorithm is done as indicated at step 804.

Thus, a preferred embodiment of the present invention extends the RARP standard reverse address resolution protocol to provide for a special request independent of the MAC address of the client. The RARP server uses the standard ARP table for mapping network physical addresses to IP addresses. It also includes a port-to-IP address table (channel number/IP address) which is used to respond to the extended RARP requests for MAC independent resolution. This table maps a port number or channel number to an IP address. This method of assigning IP addresses avoids the hassle of having to know the MAC address of the RARP client in advance.

This technique may be extended to other types of protocols, such as the BootP protocol which provides for vendor extensions. In this aspect, the vendor extensions may also be used for other functions that can be initialized based on the channel number or port upon which request is received by the server. Thus, the BootP request may request an IP address, a configuration manager ID, and configuration information independent of its MAC or physical network address.

FIG. 9 illustrates a network configuration in which the present invention may be utilized. According to the configuration of FIG. 9, a central node 900 includes a plurality of ports labelled 1, 2, 3, 4, 5, and 6. Ports 2, 4, and 5 are coupled to respective LANs 901, 902, and 903. LAN 903 includes a system operating as a network management processor 904, which may be executing such protocols as the SNMP or a Telnet protocol relying on IP addresses to access end systems and intermediate systems in the network.

Port 1 is coupled across a point-to-point communication link 905 to a leaf node 906. Leaf node 906 is coupled to LAN 907.

Similarly, node 3 is coupled across point-to-point channel 908 to leaf node 909. Leaf node 909 is coupled to a LAN 910.

Port 6 is coupled across point-to-point channel 911 to leaf node 912. Leaf node 912 is coupled to LAN 913.

As illustrated in the figure, LAN 913, link 911, LAN 903, and LAN 902 are all managed as a single IPX network, IPX 1. LAN 907 and LAN 901 are managed as a single IPX network, IPX 2. LAN 910 is managed as an AppleTalk network. The entire configuration is managed as a single IP network for the purposes of the network management processor 904. Thus, all of the leaf nodes 906, 909, 912 need an IP address for the purposes of the network management processor 904. These IP addresses may be assigned according to the present invention independent of the physical network address of the leaf node using the MAC address independent IP address resolution logic 914 according to the present invention.

Also, the network management processor 904 may include a server to manage the IP address configuration according to the present invention. For instance, a BootP protocol vendor extension could be used to tag a request packet requesting an IP address for a leaf node (e.g., node 906) with a channel number for link 905 and node number for central node 900. The central node 900 would then pass the tagged request packet to the remote network management processor 904. The network management processor 904 could then service the request packet with a database based upon the channel number and node number in the tagged request packet.

In the implementation described above based on the modified RARP protocol, the point-to-point channels were implemented using a PPP link, such that the physical port on the central node 900 could be used as a basis for configuring IP addresses. This node number is passed along with the packet to the processor in the central node according to standard techniques.

Other systems may implement more than one channel on a given physical port on the central node. For instance, a frame relay system may be used on a given link. In such a system, the DLCI (Data Link Communication Identifier) is carried with every packet on every logical connection between two points in the network. An X.25 type network which uses switched virtual circuits may also be coupled through a particular physical port on the central node 900. In such system, the X.25 address of the calling device could be used as a basis for specifying the point-to-point channel. Similarly, an ISDN port could use the unique identifier for the calling node (Q.931 address) which is used for call set up.

Accordingly, the present invention provides the ability to add new leaf nodes to a network, without requiring the network manager to know the physical network address of the leaf node before it is connected to the network. This greatly simplifies the process of adding new leaf nodes to the network, minimizes the chance of error in communicating the physical network addresses to the network manager, and otherwise contributes to the desired "plug and play" aspect of leaf node hardware.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for providing a higher level protocol identifier which identifies an addressable entity on a communication network according to the higher level protocol in response to a resolution request from a source of resolution requests in the communication network, the source having a lower level protocol identifier which identifies the source according to the lower level protocol, comprising:

a processor having a plurality of channels for connection to the communication network; and resolution logic, coupled with the communication network and in communication with the processor, to provide a higher level protocol identifier to identify the source according to the higher level protocol, in response to a particular channel in the plurality of channels through which a resolution request is received by the processor independent of the lower level protocol identifier of the source of the resolution request.

2. The apparatus of claim 1, wherein the resolution logic comprises a routine executed by the processor.

3. The apparatus of claim 1, wherein the communication network includes a network management processor in communication with the processor, and the resolution logic comprises a routine executed by the network management processor.

4. The apparatus of claim 1, wherein the resolution logic includes a resolution table configurable independent of lower level protocol identifiers, for assigning the higher level protocol identifier to particular channels of the processor through which resolution requests may be received.

5. The apparatus of claim 1, wherein the higher level protocol identifier comprises a network address for the source of the resolution request.

6. The apparatus of claim 5, wherein the lower level protocol identifier comprises a physical network address for the source of the resolution request.

7. The apparatus of claim 6, wherein the higher level protocol identifier comprises an internet protocol IP address.

8. The apparatus of claim 1, wherein the higher level protocol identifier comprises a network address for the source of the resolution request, and a host address for the source of the resolution request.

9. The apparatus of claim 1, wherein the higher level protocol comprises a network management protocol, and the lower level protocol comprises a medium access protocol.

10. The apparatus of claim 1, wherein the processor includes resources to provide services to frames of data in the communication network through the plurality of channels.

11. An apparatus for connecting a first network and a second network, comprising:

a communication link;

a first processor, having a first interface coupled to the first network and a second interface coupled to the communication link;

a second processor having a lower level protocol identifier and coupled to a second network and to the communication link; and resolution logic, coupled with the first network, to provide to the second processor a higher level protocol identifier which identifies the second processor in response to a resolution request through the second interface of the first processor independent of the lower level protocol identifier of the second processor.

12. The apparatus of claim 11, wherein the higher level protocol identifier comprises a network address for the second network.

13. The apparatus of claim 12, wherein the lower level protocol identifier comprises a physical network address for the second processor.

14. The apparatus of claim 13, wherein the higher level protocol identifier comprises an internet protocol IP address.

15. The apparatus of claim 11, wherein the higher level protocol identifier comprises a network address for the second network, and a host address for the second processor.

16. The apparatus of claim 11, wherein the higher level protocol comprises a network management protocol, and the lower level protocol comprises a medium access protocol.

17. The apparatus of claim 11, wherein the first processor includes resources to provide services to frames of data in the first and second networks through the first and second interfaces, and the second processor includes resources to extend the second interface of the first processor transparently to the second network.

18. The apparatus of claim 11, wherein the resolution logic comprises a routine executed by the first processor.

19. The apparatus of claim 11, wherein the first network includes a network management processor, and the resolution logic comprises a routine executed by the network management processor.

20. The apparatus of claim 11, wherein the resolution logic includes a resolution table configurable independent of the lower level protocol identifier of the second processor, for assigning the higher level protocol identifier to the second processor in response to the interface through which the resolution request is received by the first processor.

21. The apparatus of claim 11, wherein the communication link comprises a point-to-point channel, connecting the second interface of the first processor and the second processor.

22. An apparatus for connecting a first local area network and a second local area network, comprising:

a communication link including a point-to-point channel;

a first processor, having a first interface coupled to the first local area network and a second interface coupled to the point-to-point channel of the communication link;

a second processor having a physical network identifier and coupled to the second local area network and to the point-to-point channel of the communication link; and network management resources, coupled with the first local area network, operating according to a network management protocol, and including resolution logic to provide to the second processor a network management protocol identifier in response to a resolution request through the second interface of the first processor, independent of the physical network identifier of the second processor.

23. The apparatus of claim 22, wherein the resolution logic includes a resolution table configurable independent of the physical network identifier of the second processor, for assigning the network management protocol identifier to the second processor in response to the interface through which the resolution request is received by the first processor.

24. The apparatus of claim 22, wherein the network management protocol identifier comprises an internet protocol IP address.

25. The apparatus of claim 22, wherein the resolution logic comprises a routine executed by the first processor.

26. The apparatus of claim 22, wherein the first network includes a network management processor controlling the network management resources, and the resolution logic comprises a routine executed by the network management processor.

* * * * *